United States Patent [19]
Yocom

[11] Patent Number: 5,401,195
[45] Date of Patent: Mar. 28, 1995

[54] TROLLING SYSTEM FOR WATER CRAFTS

[75] Inventor: Garey V. Yocom, Franklin, Tenn.

[73] Assignee: Yocom-Keene Concepts, Inc., Nashville, Tenn.

[21] Appl. No.: 842,315

[22] Filed: Feb. 28, 1992

[51] Int. Cl.$^6$ ............................................. B60L 11/02
[52] U.S. Cl. ............................................ 440/6; 440/38
[58] Field of Search ................. 114/150, 151; 440/38, 440/40, 47, 6

[56] References Cited

U.S. PATENT DOCUMENTS

| | | | |
|---|---|---|---|
| 37,710 | 2/1863 | Smith | 114/151 |
| 1,197,181 | 9/1916 | Buck | 440/40 |
| 1,239,009 | 9/1917 | Hicks | 440/40 |
| 1,914,038 | 6/1933 | Ouss et al. | 440/40 |
| 1,943,152 | 1/1934 | Weiss | 440/40 |
| 2,145,493 | 1/1939 | Norquist | 114/151 |
| 2,356,301 | 8/1944 | Brace | 440/40 |
| 3,182,623 | 5/1965 | Lehmann | 114/337 |
| 3,412,705 | 11/1968 | Nesson | 114/150 |
| 3,492,965 | 2/1970 | Wayfield | 114/150 |
| 3,675,611 | 7/1972 | Glass | 440/40 |
| 3,865,067 | 2/1975 | Archer | 114/150 |
| 4,265,192 | 5/1981 | Dunn | 114/151 |
| 4,311,108 | 1/1982 | Horton | 114/61 |
| 5,181,868 | 1/1993 | Gabriel | 440/38 |

FOREIGN PATENT DOCUMENTS 0151494  9/1982  Japan .................................... 440/38

OTHER PUBLICATIONS

Motor Guide, advertising brochure.
Bassmaster Magazine, pp. 38 and 39, Jan., 1991.
Bassmaster magazine, pp. 70, 73, 74 and 77–79, Jan., 1991.
Bassmaster Magazine, p. 45, May/Jun. 1984.
Bassmaster Magazine, pp. 113–116, publication date unknown.
Bassmaster Magazine, unnumbered advertisement, May/Jun. 1984.

*Primary Examiner*—Edwin L. Swinehart
*Attorney, Agent, or Firm*—Banner, Birch, McKie and Beckett

[57] ABSTRACT

A water craft having a hull with trolling motors contained within the hull and either an inboard or outboard motor as the primary motor for moving the water craft is described. The trolling motors are contained either in angled recesses or angled passageways. Control of the motors can be accomplished by using one of at least two control devices. The hull or the like can help to insulate the motors such that noise is reduced.

30 Claims, 7 Drawing Sheets

TROLLING SYSTEM FOR WATER CRAFTS

BACKGROUND OF THE INVENTION

The present invention relates to trolling systems for water crafts and more particularly to trolling systems capable of maintaining the position of the water craft without anchoring.

Trolling motors have been in use since at least the 1940s. The basic structure of such motors has not changed since that time. Conventional trolling motors represent an improvement over the method of propelling a water craft quietly which consists of using paddles or oars. The conventional trolling motor is quieter than paddles or oars and does not require as much work. The typical trolling motor consists of a control head which controls speed and direction. A shaft connects the control head to a motor which is connected to a propeller. The conventional trolling motor is attached to the boat. It is usually attached at the bow by a bracket. This bracket normally allows the trolling motor to be pivoted into the water when in use and out of the water when the outboard motor is used to propel the boat at high speeds.

Attachment of the trolling motor and bracket is usually made at the bow. The customary procedure involves drilling a series of holes into the hull of the boat and screwing the bracket onto the boat.

While the conventional trolling motor represented an improvement over paddles and oars, the conventional trolling motor has many disadvantages. First, the trolling motor is attached to the boat by drilling holes within the hull. These holes can become a source of leaks if not patched properly when the trolling motor is removed. Further, each manufacturer of trolling motors has its own special bracket design which requires different hole patterns to be drilled in the hull of the boat when trolling motors are to be changed.

Another disadvantage of conventional trolling motors is that they have to be raised or lowered when the outboard or inboard motor is to be used in propelling the water craft. In tournament fishing, the trolling motor will be raised at least 100 times a day. Thus, the fisherman likely spends approximately an hour and a half each day of fishing raising and lowering the trolling motor. This is time that should be spent fishing. Some tournaments allow the use of a helper, but for the novice or beginner, such helpers are a luxury item which they cannot afford.

Another disadvantage is that raising and lowering the trolling motor puts a constant stress on the bracket which holds the motor to the water craft. This stress causes the bracket to fail long before other components of the trolling motor fail. It is understood that many people discard their trolling motors after bracket failure even though the main components of the trolling motor are still usable. Additionally, the conventional trolling motors require equipment such as bushings for allowing 360° rotation of the trolling motor and height adjusting thumb screws for adjusting the height of the trolling motor.

In order to be effective, the conventional trolling motor should be submerged below the water line. Thus, the conventional trolling motor is subject to interference from grasses, trees, stumps, floating debris, rocks or other obstacles. Such obstacles can prevent a boat using the conventional trolling motor from having access to known fishing places or "fishing holes". Materials such as grasses or other loose debris can have the effect of jamming or clogging the propellers of the trolling motor. Some underwater obstacles cannot only jam or clog the propeller, they can also cause damage to the shaft or propeller by either bending or breaking them.

Since they extend below the water line, conventional trolling motors can present further problems. Fish can wrap the fishing line around the shaft and, thus, generate force sufficient to cause the fishing line to break. Consequently, tales of the fish that got away are perpetuated. Further, the conventional trolling motors produce a noise which can frighten the fish which may be in the immediate vicinity of the boat.

Since they are normally mounted on the front of the water craft, trolling motors operate as a distraction and obstruction to the person driving the boat. When it is desired to operate the trolling motor, the driver must stop all engines and move from the driver's seat to the position of the trolling motor to operate it. Thus, this changing of seats wastes time. Furthermore, only one person can operate the trolling motor at any time. Therefore, if two people are fishing from the same boat, one person must stop fishing and operate the trolling motor such that they can reposition the boat when desired.

Foot controls are provided for some trolling motors. However, such foot controls add to the expense of the trolling motor by adding more equipment that can break. The foot control pad must be permanently mounted in a position close to the trolling motor. Thus, the operator is immobilized when using the foot control pad. Further, an abrupt reverse of direction, if required, is almost impossible with foot control pads.

Finally, the conventional trolling motors are ineffective in cross currents, cross winds and under certain wave conditions. In order to regain control of the boat, the operator must completely circle the boat. Thus, it is apparent from the above discussion that there are many disadvantages to the conventional trolling motor.

SUMMARY OF THE INVENTION

The purpose of the present invention is to provide a low cost, permanently installed, relatively simple, trouble free trolling system which avoids many, if not all, of the above enumerated problems of the conventional trolling motor. The preferred trolling system was designed for use in a water craft having either an inboard or outboard motor. The preferred trolling motors are easily serviceable. Thus, the preferred trolling system is designed for trouble free, infield service, while allowing for easy operation. The raising and lowering of the trolling motor is eliminated by the present invention. Also, the present invention avoids hitting submerged obstacles and floating debris. Fishing lines and anchoring ropes cannot be fouled by a shaft or propellers.

Basically, the preferred trolling system includes stationary, one directional impeller motors contained within the hull of the water craft. Such impeller motors can be computer controlled using sensors such that a particular depth of water or position of the water craft can be maintained. Also, the preferred system allows the water craft to be stopped at the exact position desired. The cost and simplicity of the present invention make it such that it is superior to conventional trolling motors.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described preferred embodiments of the invention.

DETAILED DESCRIPTION OF THE PREFERRED EMBODIMENTS

Figure 1:
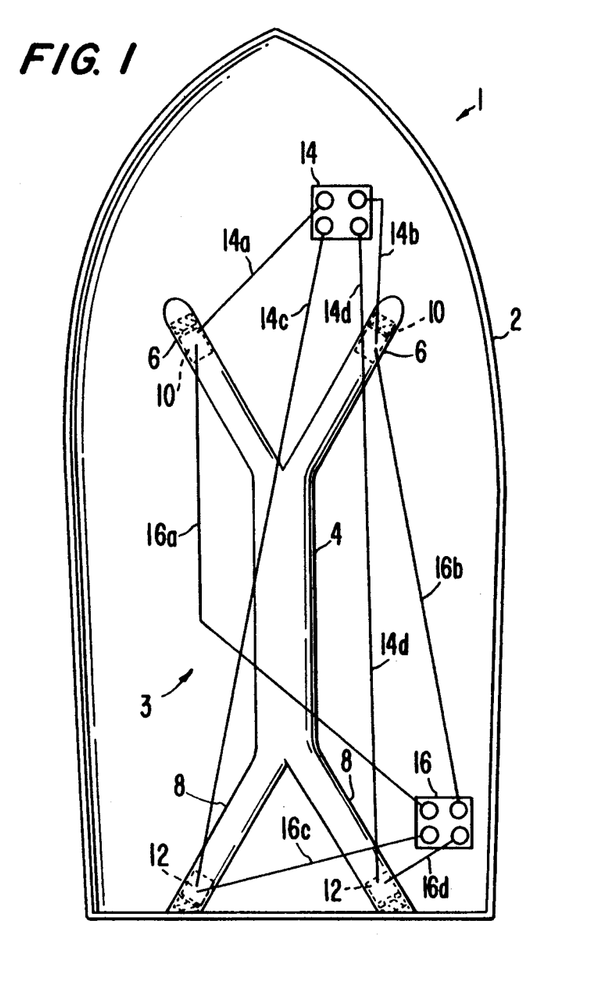
FIG. 1 is a top plan view of a water craft showing one embodiment of the present invention with the decking removed from the water craft, with the trollers being shown in phantom.

Referring to the drawings wherein like numerals indicate like elements, FIG. 1 is a top plan view of one embodiment of the present invention. Boat 2 and trolling system 3 are collectively indicated by the reference numeral 1. Boat 2 has contained therein a tubular channel or fluid passageway 4 that extends along a longitudinal axis of the boat. Passageway 4 diverges into two separate angled passageways 6 adjacent the bow or fore portion of boat 2. Passageway 4 also diverges into two separate angled passageways or channels 8 adjacent the stern or rear portion of the boat 2. Passageways 6 and 8 are angled from the longitudinal axis at preferably about 27½". This angle can be varied by about 5 to 10°. The size of the water craft the weight of the water craft or the shape of the water craft are .some of the factors that are used to determine the angle of these passageways. The purpose of angled passageways 6 and 8 will be explained further below.

One directional impeller motors 10 and 12 are contained within angled passageways 6 and 8, respectively. A control pad 14 having four switches is operatively connected to impellers 10 and 12 by lines 14a, 14b, 14c and 14d. Impeller motors 10 and 12 rotate in only one direction. Thus, four switches are preferred for completely controlling water craft movement.

Actuation of the switch attached to line 14a causes the port side front impeller motor to be actuated. Actuation of the switch attached to line 14b causes the starboard side forward impeller motor to be actuated. Actuation of the switch attached to line 14c causes the port side rear impeller motor to be actuated. Actuation of the switch attached to line 14d causes the starboard side rear impeller motor to be actuated. Thus, each impeller is independently operable.

A second control pad 16 is provided in the rear of boat 2. Control pad 16 also has four switches and lines 16a, 16b, 16c and 16d. The actuation of the switches of control pad 16 is similar to the actuation of the switches of control pad 14 and, thus, the same reference letters are used to indicate which lines actuate each impeller motor. Although it is not necessary that the motors be one directional, in this invention they can be one directional to lower cost.

Control pads 14 or 16 do not have to be physically attached to the impeller motors. One or both of the control pads can be a radio controlled device. Other remote control systems can also be used for enabling the operator to move from one position in the boat to another while still having control over the impeller motors and hence the trolling operation of boat 2. Also if certain remote control units are used, the trolling motion of the water craft can be controlled from shore or some other location than the water craft.

Control pads 14 and 16 do not have to consist of a plurality of switches, but can be a joystick, a steering wheel, foot pedals or may just consist of switches or buttons having icons indicating water craft movement.

Figure 2:
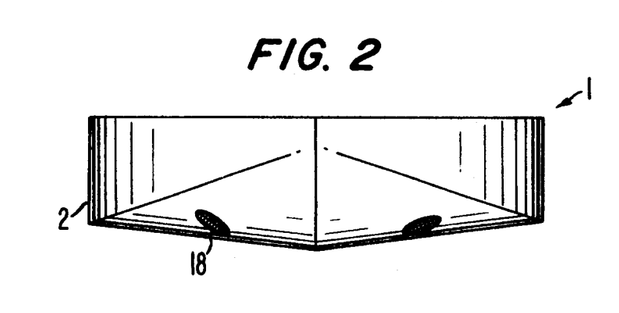
FIG. 2 is a front view of FIG. 1.
Figure 3:
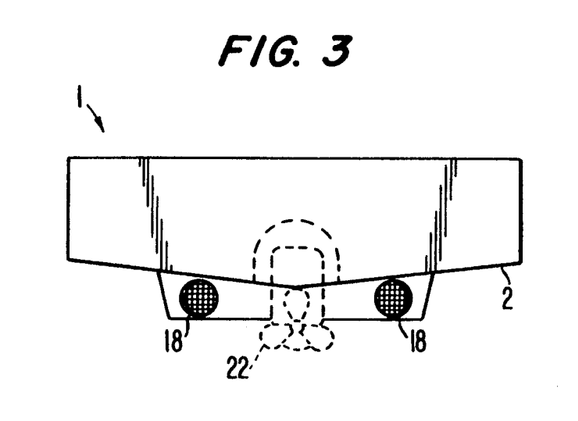
FIG. 3 is a rear view of FIG. 1 showing the water craft incorporating an inboard motor.

FIGS. 2 and 3 show front and rear views of the boat of FIG. 1. Both FIGS. 2 and 3 show that it is preferable to have screens 18 in place for blocking materials such as grass or other submerged debris from entering passageways 6 and 8. Thus, fouling of the impellers 10 and 12 can be prevented. FIG. 3 shows boat 2 having an inboard motor 22 which is the main propulsion unit for boat 2. Inboard motor 22 and outboard motor 24 are two types of primary motors envisioned as being usable with the present invention. However, the invention is not limited to use with water craft having these types of motors. Although not necessary, it is preferred to have the motors and impellers at the ends of the angled passageways. This should also reduce the intrusion of debris into the passageways.

In addition, it is preferred that passageways have openings of approximately 3" in diameter.

Figure 4:
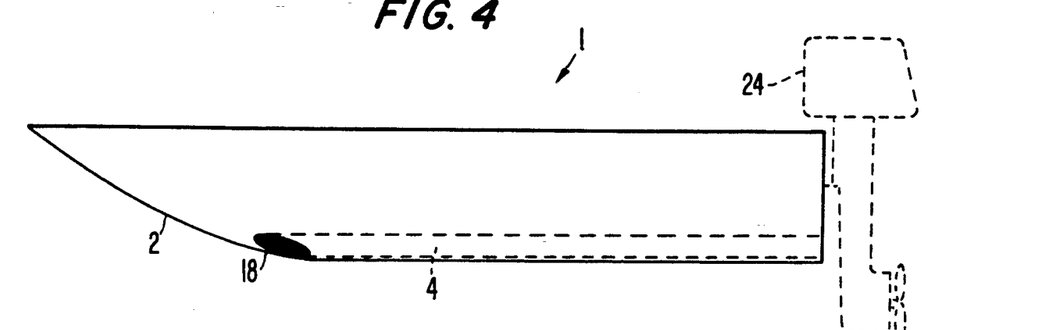
FIG. 4 is a side view of the embodiment of FIG. 1 showing the water craft incorporating an outboard motor.

FIG. 4 is a side view of the boat of FIG. 1. However, instead of inboard motor 22, outboard motor 24 is attached to the taffrail of the boat. Inboard motor 22 and outboard motor 24 are both generally capable of moving boat 2 at high speeds. Such motors can be rated at from around 25 horsepower to more than 200 horsepower. Some motors are capable of propelling the boat at speeds in excess of 70 mph. In order for boat 2 to be able to be propelled at these speeds, passageways 6 and 8 are preferably angled such that these passageways do not impair high speed movement. Also, angled passageways will allow for quieter approaches to fishing areas when trolling. Further, impeller motors 10 and 12 are insulated by the hull and this also helps to reduce noise which might frighten fish. In other words, the boat can move in a trolling manner without producing noise sufficient to frighten nearby aquatic creatures.

Impeller motors 10 and 12 are generally rated in the range of a fraction of a horsepower to approximately 5 horsepower. However, the size of the trolling motors is a function of the weight and shape of the water craft, just as the size of the inboard or outboard motor required is dependent upon such parameters.

Debris can be prevented from entering angled passageways 6 and 8 by screens 18. However, if material or debris should block screen 18, all that is required is a momentary activation of the one directional impellers should force the debris clear of screen 18.

Figure 5:
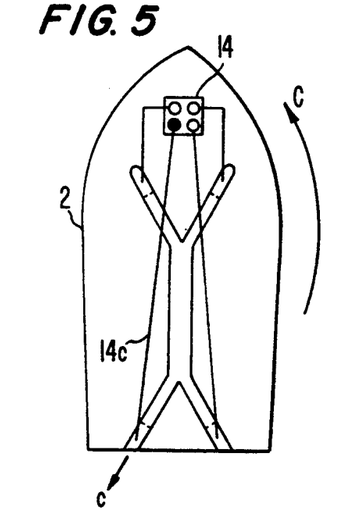
FIGS. 5-14 show schematically control and movement of the water craft using a control pad.
Figure 6:
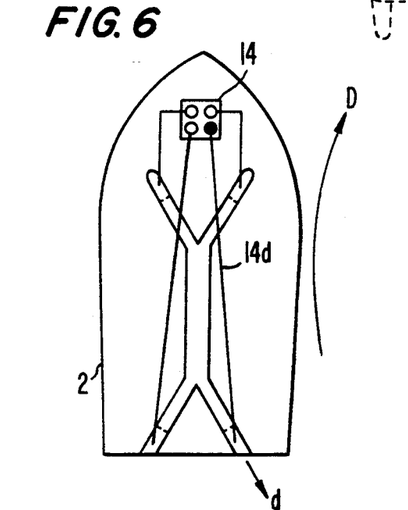
Figure 7:
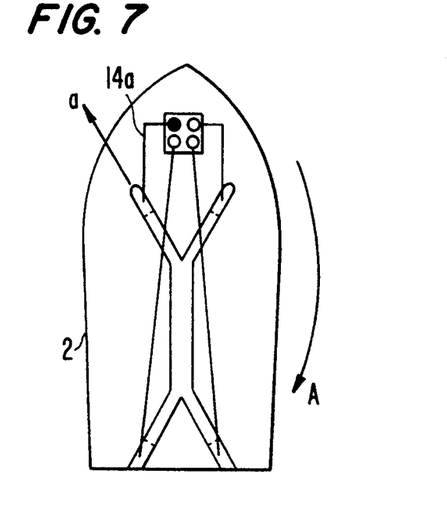
Figure 8:
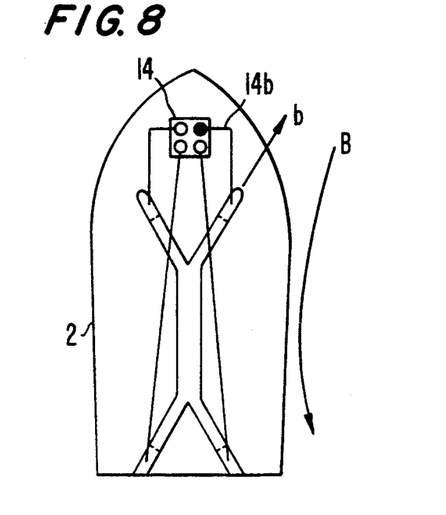

FIGS. 5-14 show the thrust from a particular impeller or combination and the corresponding movement of boat 2. When the left rear impeller is actuated, a thrust c is caused to move the boat in a wide turn C toward the left as shown in FIG. 5. When the right rear impeller motor is actuated, a thrust d is caused and the boat turns to the right in a large circle D, as shown in FIG. 6. Actuation of the port side front impeller causes a thrust a and turn A turns the boat to the rear and left as in FIG. 7. As shown in FIG. 8, actuation of the right front impeller motor alone causes a thrust b and a turn B toward the rear and right.

Figure 9:
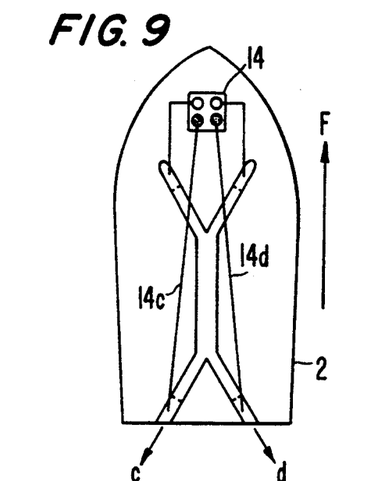
Figure 10:
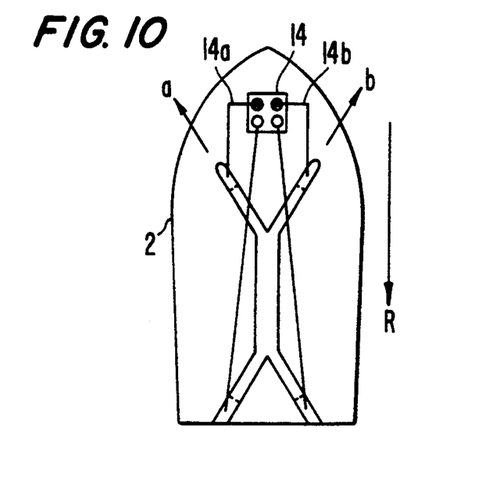
Figure 11:
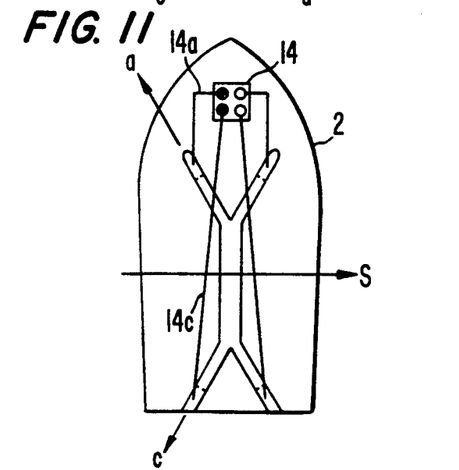
Figure 12:
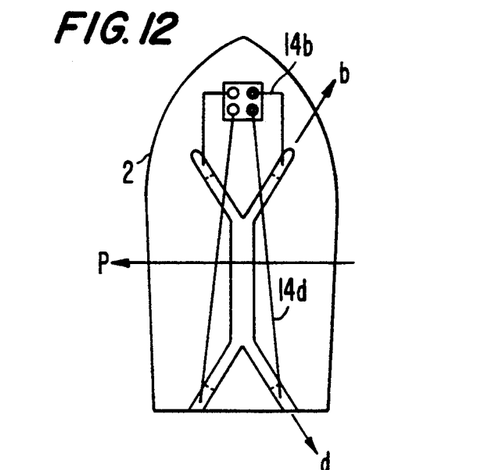
Figure 13:
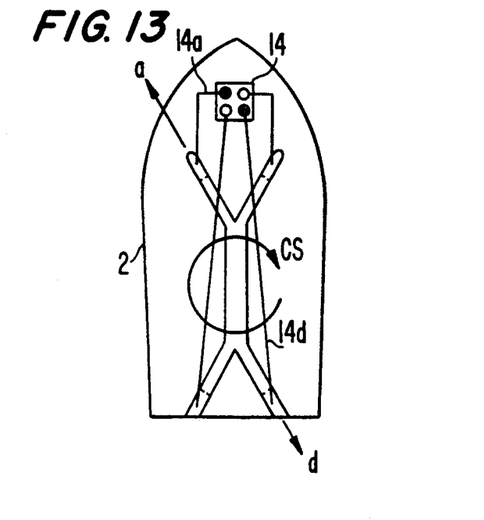
Figure 14:
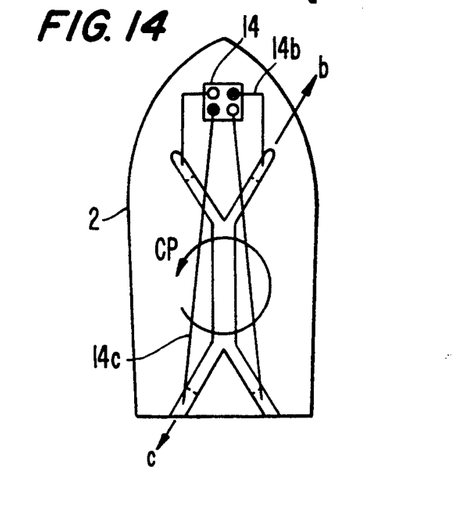

When both rear impellers are actuated, thrusts c and d are provided. The sideward components of the thrusting forces cancel out and a forward movement F, shown in FIG. 9, is caused. Actuation of the forward impellet motors causes thrusts a and b to be produced and a rearward movement R of boat 2, as shown in FIG. 10. If the port side impeller motors are actuated, thrusts a and c produces a movement to the right or starboard S as shown in FIG. 11. When the starboard side impellers are actuated, as in FIG. 12, thrusts b and d cause a movement to the left P or port side. Actuation of the forward port side impeller motor and the rearward starboard side impeller motor cause thrusts a and d and produces a tight circle CS that moves boat 2 in a clockwise direction as shown in FIG. 13. If the starboard side forward impeller motor and the rearward port side impeller motor are actuated, thrusts b and d cause a tight circular movement for boat 2 in a counterclockwise direction as shown in FIG. 14.

In addition, recesses are angled relative to the longitudinal axis of the hull so that the boat or water craft can be almost immediately stopped without overrunning the desired position. For example, by implementing exact opposite counter motors momentarily at the end of each position change, substantially all inertia and momentum of the water craft can be dispelled immediately. In other words, the water craft can be stopped exactly where the operator wants it without overrunning the desired position. Thus, the trolling system described herein can make most any desired water craft correction simple including the finishing touch of winding up exactly where you want to be.

Furthermore, it is recognized that variations on FIGS. 5-14 can be made to obtain different combinations of direction change. It is also recognized that the thrusts of the different impellers could be independently controlled and modified to bring about different directional changes. For example, the impellers can be controlled to hold the water craft stationary in water with a current without using an anchor. These variations can be encompassed by this invention.

Figure 15:
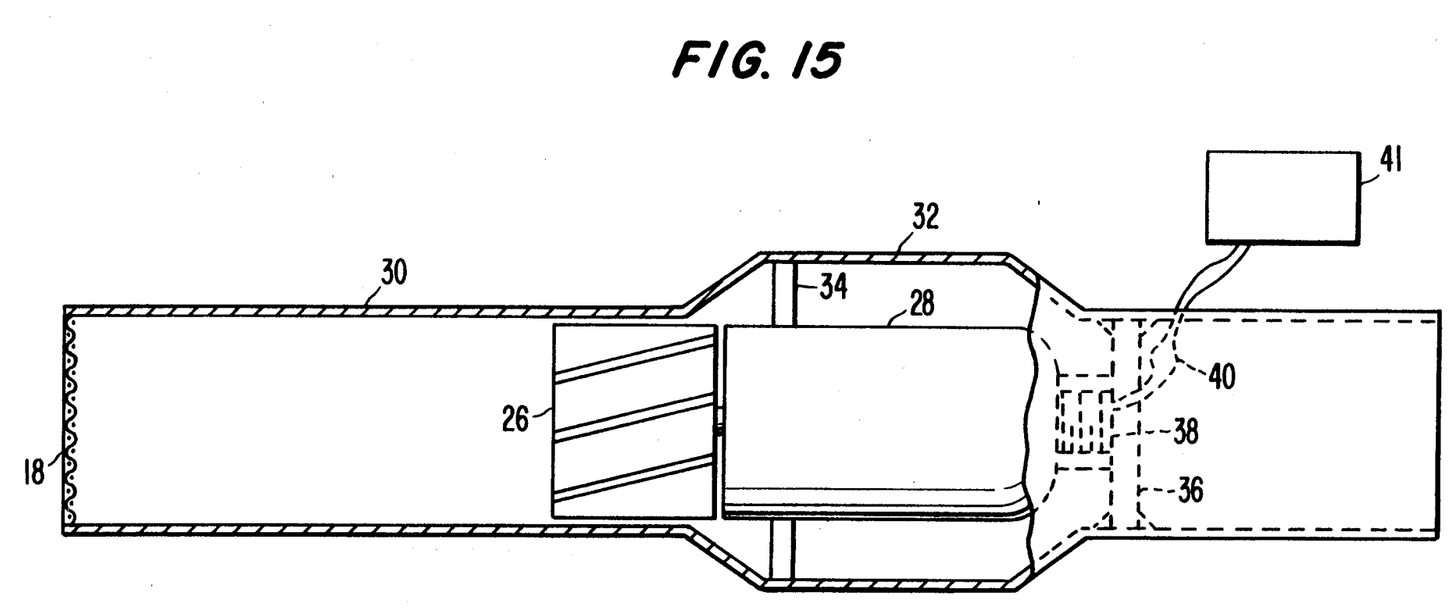
FIG. 15 shows an angled passageway with a trolling motor contained therein.

A typical impeller with motor is shown contained within a passageway in FIG. 15. The passageway has forward portion or end 30 which is covered by screen 18. End 30 includes an enlarged section 32 which houses impeller motor 28 with impeller 26 extending into forward portion 30. Support members 34 and 36 position and hold impeller motor 28 within enlarged section 32. Enlarged section 32 allows the drainage of water from the flow lines or passageways during takeoff using the main power source, i.e., the inboard or outboard motor. Drainage is improved since enlarged section 32 increases the flow rate of water in and around the impeller motors.

Impeller motor 28 is attached to support 36 by use of a screw thread coupling 38. Motor 28 is a one-directional electric motor connected to a source of power 41 such as a battery, a solar powered cell or a generator through screw coupling 38 and leads 40. While a screw thread coupling is show for attaching impeller motor 28 in enlarged portion 32, such a coupling may take the form of a quick connect type coupling, a snap fit coupling or any other coupling which allows easy removal of impeller motor 28. Also, the leads 40 do not have to pass through the coupling, but may attach separately to the impeller motor 28.

It is preferred to have removable motors 28 for at least two reasons. Should a motor cease to operate, a spare motor can quickly replace it. Also, servicing the motor can then be done without taking the water craft out of service.

Figure 16:
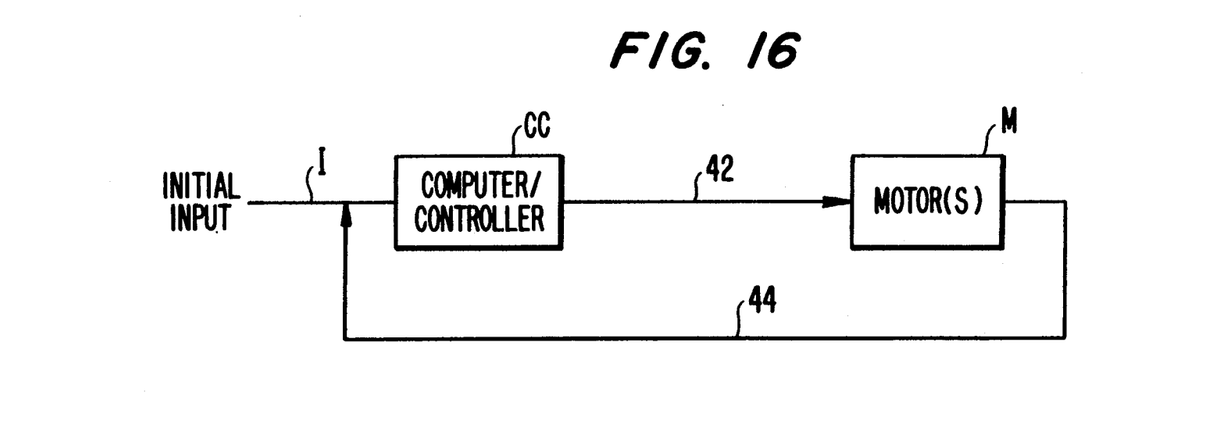
FIG. 16 shows one embodiment of a controller for the present invention.

FIG. 16 illustrates one embodiment of a computer controlled circuit for the present invention. In this circuit, an initial input I is input to the computer/controller CC. The computer/controller CC sends a signal along line 42 to motors M. Motors M are caused to actuate given the instructions sent from computer/controller CC. An output from the motors M is then fed back along line 44 to the computer/controller CC. Thus, feed back control of motors M is achieved. Initial input I can come from the control pad or from some other remote control source or be preprogrammed. A delay circuit or a delay program can be used to provide intermittent operation of the impeller motors.

Figure 17:
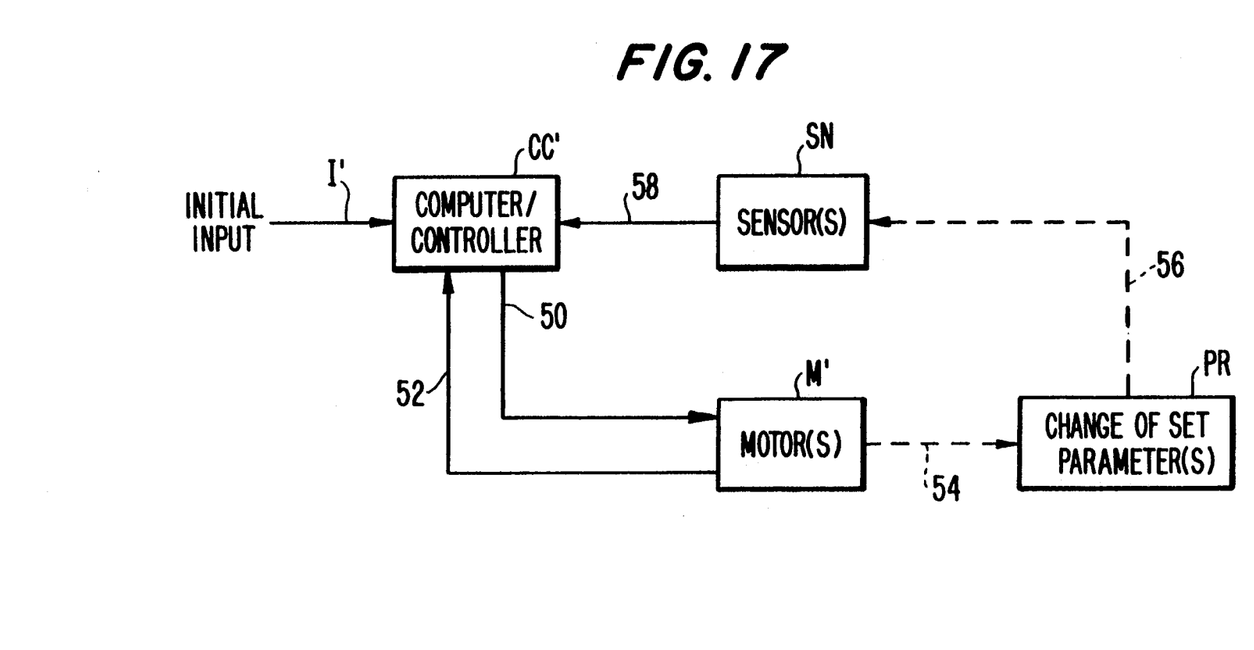
FIG. 17 shows another embodiment of a controller for the present invention.

FIG. 17 shows another type of control circuit which can be used with this system. An initial input I' is fed into computer/controller CC'. The computer/controller CC' sends a signal along line 50 to motors M'. Motors M' can then send a signal back along line 52 to the computer/controller CC'. This portion of the control circuit is similar to the control circuit of FIG. 16. However, this circuit differs in that when motors M' change a set parameter such as the position of the water craft, this information is fed back along line 56 to sensors SN. Sensors SN then feed the information along line 58 back to computer/controller CC'. Computer/controller CC' can then start the water craft, adjust the speed or change the impeller motor or impeller motors that are to be actuated. Thus, computer/controller CC' can effectively position the water craft depending upon any number of sensor readings such as depth or temperature of water, position from shore, or some other variables.

Figure 18:
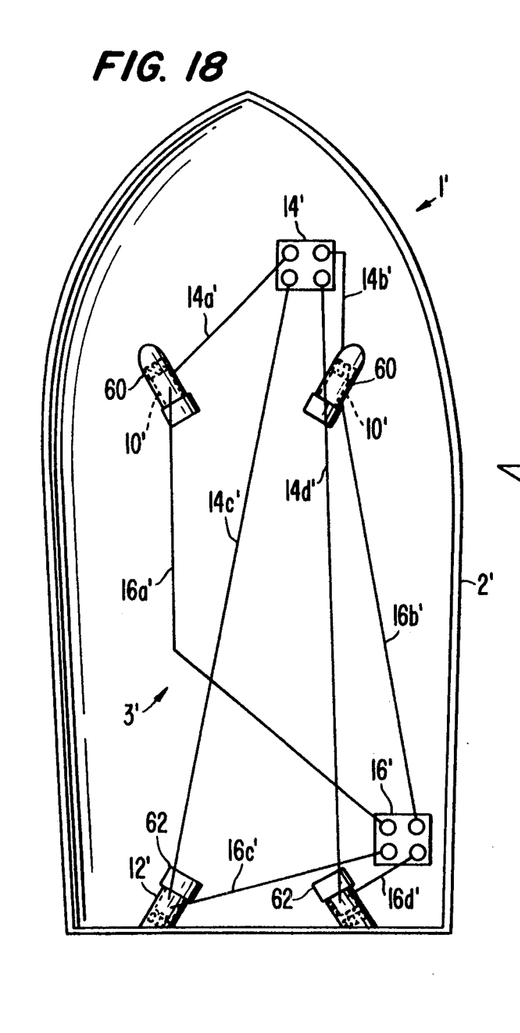
FIG. 18 shows a top plan view of a water craft having the flooring removed illustrating another embodiment of the present invention.

FIG. 18 shows another embodiment of a boat using a trolling system in accordance with the present invention. In this embodiment, like elements are given a prime reference number when they are similar to the items discussed with regard to the embodiment of FIG. 1. In this embodiment, boat 2' includes four impellers 10' and 12' positioned at the rear and forward portions of boat 2'. Control pads 14' and 16' are connected to the impeller motors. Both control pads 14' and 16' operate in the same manner as control pads 14 and 16 to thus control the impeller motors and the movement of boat 2'.

Figure 19:
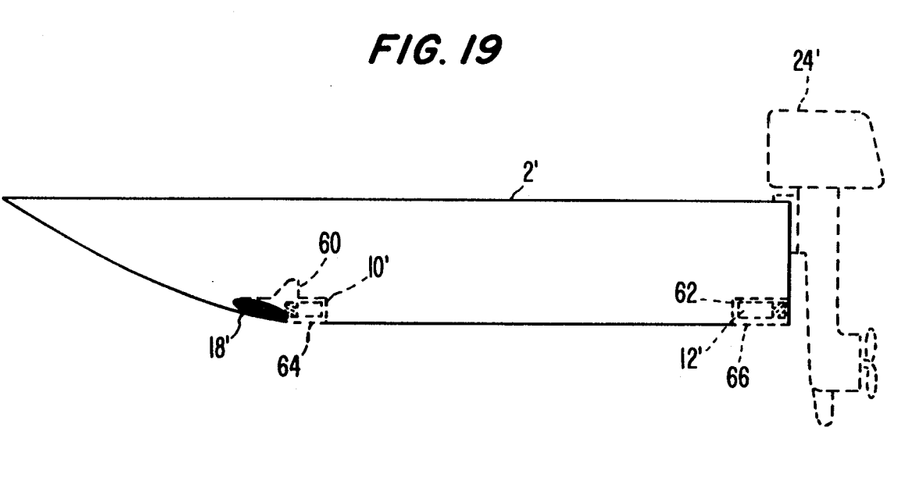
FIG. 19 shows a side view of the embodiment of FIG. 18.

Impeller motors 10' and 12' are contained within recesses 60 and 62, respectively, in the hull of boat 2'. As seen in FIG. 19, recesses 60 and 62 do not extend the full length of the boat, but merely form pockets for containing impeller motors 10' and 12'. Screens 18' cover the exit area of recesses 60 and 62. Water intakes 64 and 66 are provided for recesses 60 and 62 to, thus, allow water to flow into recesses 60 and 62 and be impelled by impeller motors 10' and 12' through screens 18'. Thus, the need for a longitudinal passage along the length of the boat is eliminated. Further, as shown in FIG. 19, boat 2' uses an outboard motor 24'. However, it should be noted that boat 2' could use an inboard motor or some other primary power source.

Figure 20:
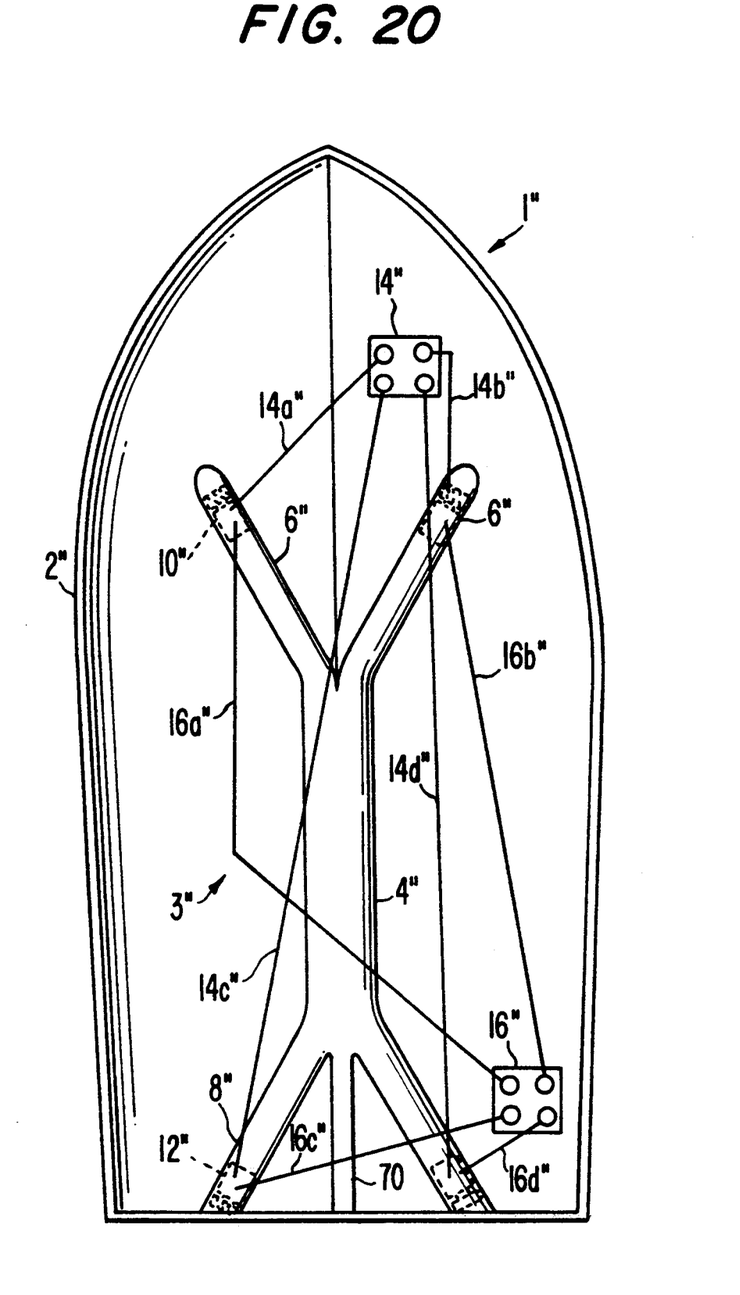
FIG. 20 is a top plan view of another embodiment of a water craft incorporating the present invention.

FIG. 20 shows yet another embodiment of a boat using a trolling system in accordance with the present invention. In this embodiment, like elements are denoted by double prime reference numbers when they are similar to the items discussed with regards to the embodiment of FIG. 1. Boat 2" includes fluid passageway 4" and angled passageways 6" and 8". Impeller motors 10" and 12" are contained in their respective angled passageways. Control pads 14" and 16" are operatively linked to each of impeller motors 10" and 12" in a fashion similar to the embodiment of FIG. 1.

An additional or passive intake/exhaust port 70 can be provided in boat 2 at a position immediately in front of the primary motor. Passive port 70 is in fluid communication with passageway 4", 6" and 8". Other positions for passive port 70 are possible. However, the primary motor provides some protection from large debris and also provides for quick drainage of water from passageways 4", 6" and 8" during takeoff by the primary motor. Passive port 70 also provides a constant supply of water to counter possible vacuum effects caused by having opposed impellers. Thus, floating debris which may be pulled to a screen 18 of an inactive impeller motor does not reduce the supply of water to the active impellers.

While the above description of the preferred embodiments of the invention have been described in the context of boats, the invention is not limited thereto. Various other boats, such as general leisure craft, amusement park rides, jon boats, pontoon boats or ski boats can make use of the present invention.

Numerous characteristics, advantages and embodiments of the invention have been described in detail in the foregoing description with reference to the accompanying drawings. However, the disclosure is illustrative only and the invention is not limited to the precise embodiments illustrated. Various modifications and changes can be made herein by one of ordinary skill in the art without departing from the spirit or scope of the invention.

What is claimed is:

1. In combination a water craft and trolling system comprising:
   a water craft having a hull defining fore portion, a stem portion, and port and starboard sides;
   a primary motor, attached to said hull, for propelling said water craft through water; and
   a trolling system for trolling said water craft through water, said trolling system including at least one fluid passageway extending from along a longitudinal axis of said water craft, said fluid passageway having two angled passageways at both of said fore portion and said stern portion of said fluid passageway and extending through said hull to allow ingress and egress of water through said fluid passageway, said trolling system also including an impeller and an impeller driving motor positioned in each angled passageway and each of said impellers being operably coupled to a respective impeller driving motor for effecting trolling movement of said water craft.

2. A water craft and trolling system as in claim 1 wherein said trolling system includes a passive port in fluid communication with said fluid passageway and said angled passageways.

3. A water craft and trolling system as in claim 1 wherein each said impelling driving motor is one directional, such that the coupled impellers rotate in only one direction.

4. A water craft and trolling system as in claim 1 wherein said impeller driving motors are electrically operated.

5. A water draft and trolling system as in claim 4 wherein said electrically operated impeller driven motors are powered by a solar cell.

6. A water craft and trolling system as in claim 4 wherein said electric impeller driving motors are battery powered.

7. A water craft and trolling system as in claim 1 wherein said impeller driving motors are each individually controllable by at least two separate manual controls.

8. A water craft and trolling system as in claim 1 wherein said primary motor further comprises an outboard motor.

9. A water craft and trolling system as in claim 8 wherein said trolling system further comprises an electric motor driven impeller positioned in each of said angled passageways, and wherein said electric motor driven impellers are rated at a horsepower substantially less than the horsepower of said outboard motor such that when said impellers are operated, said water craft moves in a trolling manner without producing noise sufficient to frighten nearby aquatic creatures.

10. A water craft and trolling system as in claim 1 wherein said primary motor further comprises an inboard motor.

11. A water craft and trolling system as in claim 10 wherein said trolling system further comprises an electric motor driven impeller positioned in each of said angled passageways, and wherein said electric motor driven impellers are rated at a horsepower substantially less than the horsepower of said inboard motor such that when said impellers are operated, said water craft moves in a trolling manner without producing noise sufficient to frighten nearby aquatic creatures.

12. In a water craft hull, a trolling system comprising:
   a fluid passageway extending along a longitudinal axis of said water craft hull;
   a pair of angled passageways, each extending at an angle greater than zero from said fluid passageway and through the hull of said water craft such that water can flow into or out of said fluid passageway;
   a motor positioned in each of said angled passageways; and
   an impeller positioned within each said angled passageway and driven by a corresponding one of said motors, and means for independently actuating said impellers and for enabling said water craft to turn, move or stop by independent actuation of said impellers to effect a trolling movement.

13. A trolling system as in claim 12 wherein said motor is a one directional electric motor.

14. A trolling system as in claim 12 wherein said motor is mounted within said angled passageway using a single screw thread coupling.

15. A trolling system as in claim 12 wherein said impeller is controllable by at least two control pads.

16. A trolling system as in claim 12 wherein said angled passageway is angled at generally 27½ plus or minus 10° relative to said fluid passageway.

17. A trolling system as in claim 12 wherein a passive port is provided in fluid communication with said fluid passageway and said angled passageways.

18. A water craft comprising:
a hull having a fore portion, a stem portion and starboard and port sides;
at least one fluid passageway extending along a longitudinal axis of said water craft; and
two angled passageways extending at an angle from said fluid passageway adjacent said fore portion of said hull and two angled passageways extending at an angle from said fluid passageway adjacent said stem portion of said hull, said angled passageways extending through said hull such that only four holes, associated with said angled passageways are formed in said hull for the ingress and/or egress of water, and wherein an impeller is mounted in each of said angled passageways.

19. A water craft as in claim 18 wherein said water craft includes a water line defined by the level to which water rises on the exterior of said hull when said water craft is placed in water, and wherein said fluid passageway and said angled passageways are positioned wholly below said water line.

20. A water craft as in claim 18 wherein each of said angled passageways are generally at an angle in the range of 17½ to 37½ from said fluid passageway.

21. A water craft as in claim 18 further comprising fasteners for removably mounting said impellers in said angled passageways.

22. A water craft as in claim 21 wherein said impellers are attached to motors contained in said angled passageways and said fasteners mount said motors therein, said fasteners including, in each instance, a single screw thread connection between said motor and said angled passageway.

23. A water craft as in claim 18 wherein said impellers are coupled to at least two movable manual controls for independently controlling actuation of said impellers.

24. A water craft as in claim 18 further comprising an outboard motor attached to said hull for propelling said water craft independent of said impellers.

25. A boat as in claim 24 wherein said impellers are powered by electric motors rated at a horsepower substantially less than the horsepower of said outboard motor, such that when said impellers are actuated, said water craft moves in a trolling manner without producing noise sufficient to frighten nearby aquatic creatures.

26. A water craft as in claim 18 further comprising an inboard motor attached to said hull for propelling said water craft independent of said impellers.

27. A water craft as in claim 26 wherein said impellers are powered by electric motors rated at a horsepower substantially less than the horsepower of said inboard motor, such that when said impellers are actuated, said water craft moves in a trolling manner without producing noise sufficient to frighten nearby aquatic creatures.

28. A water craft as in claim 18 wherein the ingress and/or egress of water in said angled passageways can be adjusted so that said water craft can turn any degree up to a full 360°.

29. A water craft as in claim 18 wherein the ingress and/or egress of water in said angled passageways can be controlled from anywhere on said water craft by movable control elements.

30. A water craft as in claim 18 further comprising a passive port in fluid communication with said fluid passageway and said angled passageways.

* * * * *